United States Patent [19]

Ohzono et al.

[11] Patent Number: 4,753,330

[45] Date of Patent: Jun. 28, 1988

[54] MULTIPLE CLUTCH SYSTEM HAVING CAM COUPLER BETWEEN CLUTCHES

[75] Inventors: Kouhei Ohzono; Yoshihisa Iwatsuka, both of Saitama, Japan

[73] Assignee: Honda Giken Kogyo Kabushiki Kaisha, Tokyo, Japan

[21] Appl. No.: 881,615

[22] Filed: Jul. 3, 1986

[30] Foreign Application Priority Data

Jul. 3, 1985 [JP] Japan ................................ 60-146389

[51] Int. Cl.[4] .............................................. F16D 21/08
[52] U.S. Cl. .................................... 192/48.4; 192/35; 192/48.5; 192/48.6; 192/83; 192/105 CD; 192/105 CE
[58] Field of Search ..................... 192/48.1, 48.2, 48.3, 192/48.5, 48.6, 48.92, 105 CD, 105 CE, 93 A, 93 R, 35, 83, 48.4

[56] References Cited

U.S. PATENT DOCUMENTS 3,000,480  9/1961  Bochory ................. 192/105 CD X
4,425,989  1/1984  Gotoda .............................. 192/48.92
4,645,049  2/1987  Matsuda et al. ............... 192/48.3 X Primary Examiner—Rodney H. Bonck
Assistant Examiner—David A. Testardi
Attorney, Agent, or Firm—Lyon & Lyon

[57] ABSTRACT

A clutch having a starter clutch mechanism and a manual clutch mechanism combined on a driven shaft. The starter clutch mechanism is positioned within a clutch outer of the manual clutch and operates through a cam to transmit relative rotational motion into axial motion for actuating the main clutch. The relative rotational motion is experienced when the starter clutch mechanism reaches the appropriate speed for engagement. A throw-out linkage is provided outwardly of the main clutch and actuates the thrust plate through the center of the main clutch inner. Thus, the starter clutch mechanism, the cam shaft and the thrust plate may be located inwardly of the main clutch mechanism within a cylindrical clutch outer closed at one end.

20 Claims, 5 Drawing Sheets

MULTIPLE CLUTCH SYSTEM HAVING CAM COUPLER BETWEEN CLUTCHES

BACKGROUND OF THE INVENTION

The field of the present invention is clutches in multiple clutch arrangements.

In certain vehicle uses, centrifugal clutches used for starting have been found advantageous. In certain such devices it has also been found advantageous to provide a manually actuated clutch for disengaging the drive train for changing gears and the like. One such clutch system has been devised and is illustrated in FIG. 1.

In FIG. 1, a clutch system 1 is shown positioned within the drive train of a vehicle between the variable speed engine output shaft 2 and a driven shaft 3. A starting clutch 4 of a centrifugal type is installed on the output shaft 2 to sense engine speed for engaging the clutch. Installed on the driven shaft 3 is a manually actuated clutch 5 of the multidisc type. The clutches 4 and 5 are coupled together in series. In such a system, when the number of revolutions of the engine is lower than a preselected value, the centrifugal clutch 4 is disengaged and power is not transmitted. When the speed of the engine increases, the centrifugal clutch 4 is engaged and the power transmission is then controlled manually by a clutch linkage 7 operating against spring mechanisms 6 exerting fixed clamping forces on the manually controlled clutch 5.

A difficulty encountered with arrangements such as shown in FIG. 1 is the shear size of the clutching mechanism. Because the two clutches 4 and 5 are arranged on different shafts, a large amount of space is required. In the example of FIG. 1, it is seen that the clutches may be placed in an overlapping manner. However, the arrangement can still be a problem for smaller vehicles having limited room.

Another difficulty encountered with clutches in general is that the clamping force of the spring mechanism 6 to prevent clutch slippage under anticipated power may be greater than desired for easy manual operation. Ironically, the heavy spring compression is typically not required under conditions when the clutch is to be actuated. When a manual clutch is employed, power is usually reduced and a full torque load is not experienced. When full power is directed to the drive train, a clutching operation is normally not undertaken.

When clutches having different functions are employed in series such as in the device of FIG. 1, the maximum torque to be transmitted through each clutch is the same. Consequently, each clutch is required to be equally strong, large enough to accommodate the transmitted torque and, necessarily, more expensive than might otherwise be required.

SUMMARY OF THE INVENTION

The present invention is directed to a clutch system having multifunction capability. A manually actuated clutch and a centrifugal clutch are arranged about a common axis. The centrifugal clutch mechanism may be employed as an actuator operating on the principal clutch with the two clutches coaxially arranged. With such an arrangement, the overall clutch package may be reduced in size, a lighter weight and less expensive centrifugal clutch may be employed and the actuation forces required on the manual clutch may be reduced.

Accordingly, it is an object of the present invention to provide an improved clutch mechanism which is both a centrifugal and manually actuated clutching mechanism. Other and further objects and advantages will appear hereinafter.

DETAILED DESCRIPTION OF THE PREFERRED EMBODIMENT

Figure 1:
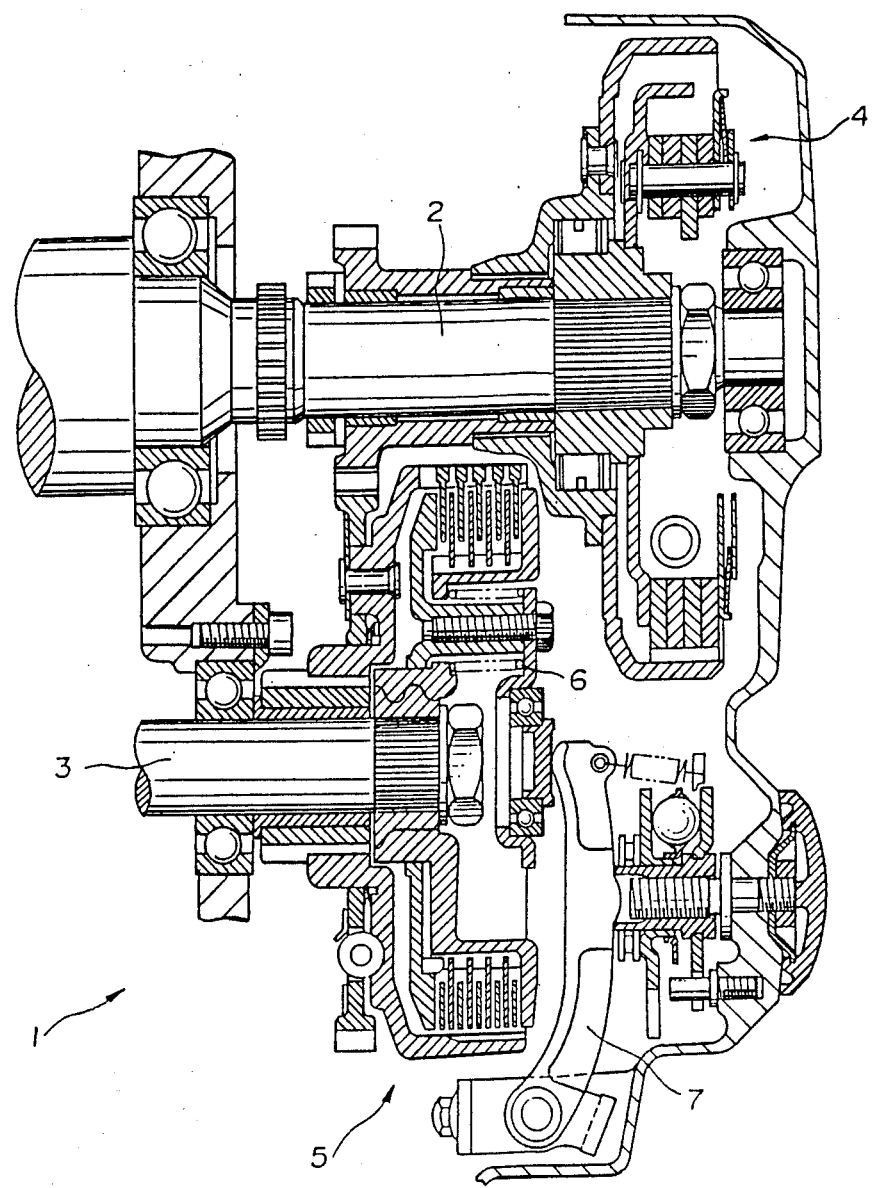
FIG. 1 is a cross-sectional view of a prior art clutch employing a centrifugal clutch and a manual clutch.
Figure 2:
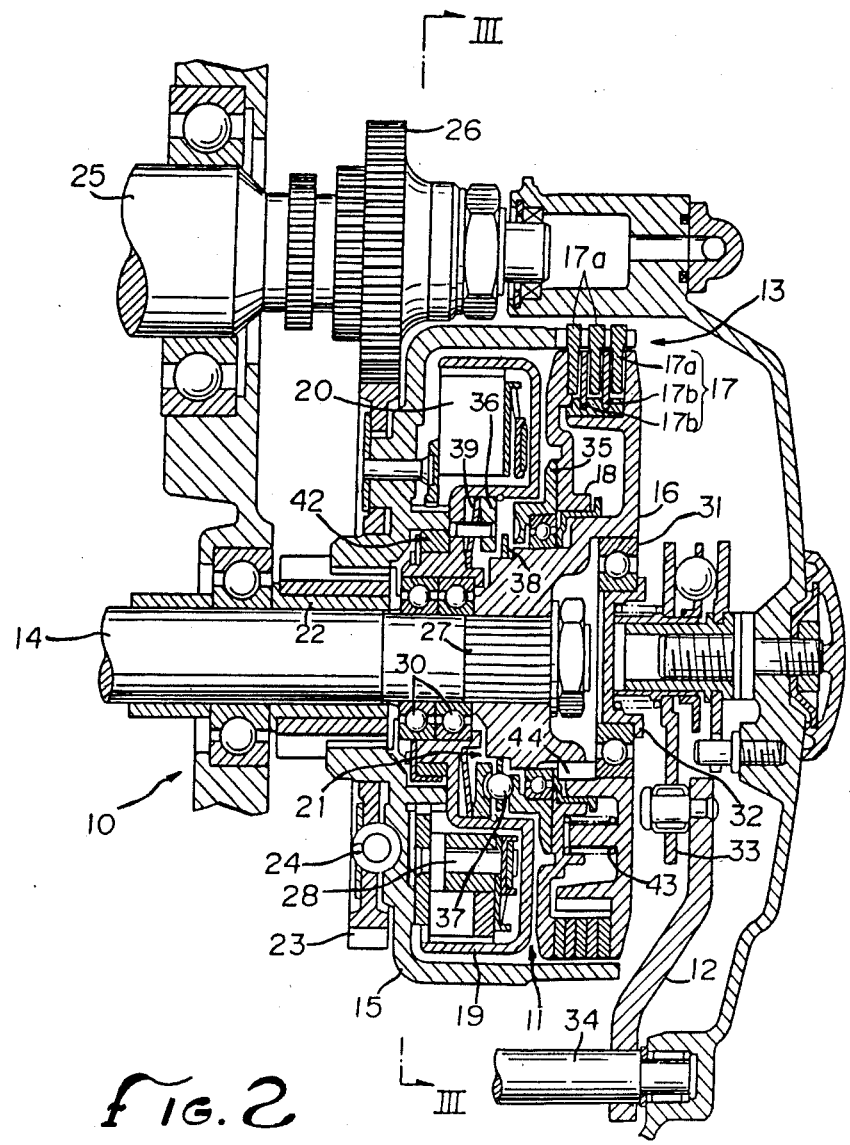
FIG. 2 is a cross-sectional view of a clutch of the present invention.
Figure 3:
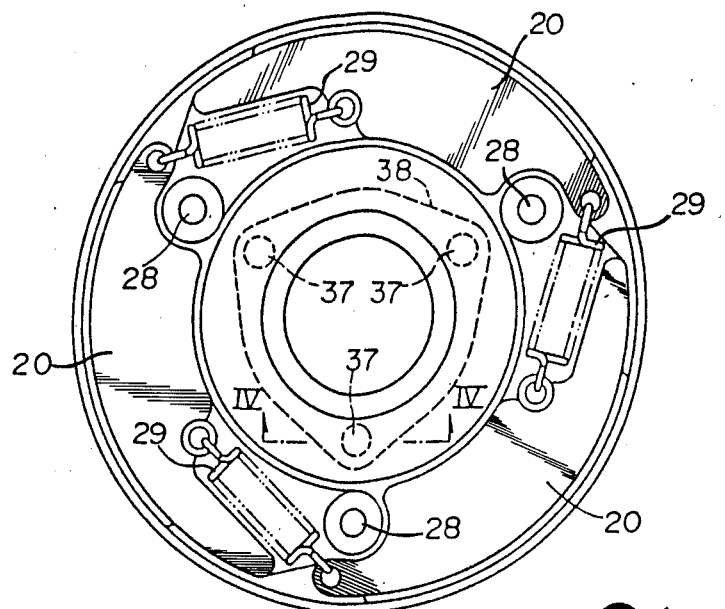
FIG. 3 is a cross-sectional end view taken along line III—III of FIG. 2.
Figure 4:
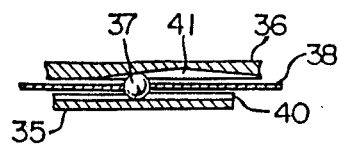
FIG. 4 is a cross-sectional view taken along line IV—IV of FIG. 3.

Turning in detail to the drawings, FIGS. 2, 3 and 4 illustrate a first embodiment of the present invention. A clutch system, generally designated 10, for a vehicle having a variable speed engine is disclosed. The clutch system 10 is provided with a starting clutch, generally designated 11, which is responsive to the speed of the engine. A manual clutch, generally designated 13, is provided adjacent to the starting clutch 11 for manually controlling the transmission of power from the engine. The manual clutch is operated by a clutch lever 12. The starting clutch 11 and the manual clutch 13 are coaxially mounted on a driven shaft 14.

The manual clutch 13 includes a clutch outer 15 which provides an input to the clutching mechanism. The clutch outer 15 is rotatably installed on the driven shaft 14. A clutch inner or clutch center 16 is also mounted on the driven shaft 14 and is fixed to rotate therewith. A friction disc mechanism 17 is operationally positioned between the clutch inner 16 and the clutch outer 15 and is controlled by a pressure plate 18. The manual clutch 13 is arranged to form a cylindrical cavity closed at one end. At the closed end, the clutch outer 15 is mounted about the driven shaft 14. At the open end of the clutch outer 15, it meets with the clutch inner 16 through the friction disc mechanism 17.

The starting or centrifugal clutch 11 comprises a second clutch outer 19 rotatably installed on the driven shaft 14 within the cylindrical cavity between the closed end of the clutch outer 15 and the pressure plate 18. Clutch shoes 20 are pivotally installed on a portion of the main clutch outer 15 defining a clutch inner for the starter clutch. Under appropriate engine speeds, the shoes 20 swing outwardly against the clutch drum of the second clutch outer 19 to drive a cam mechanism, generally designated 21, for pressing the pressure plate 18 against the clutch center 16 as the result of relative rotation between the second clutch outer 19 and the pressure plate 18.

Looking in somewhat greater detail, the clutch outer 15 is formed in a cylindrical shape with one end closed. At the closed end, the clutch outer 15 is installed through a collar 22 on the driven shaft 14. A driven gear 23 is arranged coaxially on the clutch outer 15 and coupled thereto by means of a buffer coil spirng 24 to the outside of the clutch outer 15. The driven gear 23 is engaged with a drive gear 26 provided on an output shaft 25 from a variable speed engine. The output shaft 25 is arranged parallel with the driven shaft 14. As the engine output shaft 25 rotates, the clutch outer 15 rotates.

The clutch inner 16 is fixed to rotate with the driven shaft 14 through a spline 27 formed on the periphery of the driven shaft 14. The clutch inner 16 is located at the open end of the clutch outer 15 with the friction disc mechanism extending between the clutch inner 16 and the clutch outer 15 at the outer end of the cavity thereof. The friction disc mechanism 17 includes a plurality of friction discs 17a coupled with the clutch outer 15 in alternating position with friction discs 17b coupled with the clutch inner 16.

Located at the closed end of the clutch outer are the clutch shoes 20. The clutch shoes 20 are of arc shape and are pivotally mounted to the wall of the clutch outer 15 in a manner defining a starter clutch inner. The clutch shoes 20 are each supported by a pin 28 projecting from the wall of the clutch outer 15 defining the starter clutch inner. Attached as can best be seen in FIG. 3 to the clutch shoes 20 are shoe return springs 29. The shoe return springs 29 bias the shoes 20 away from the clutch drum of the starter clutch outer 19. A preselected speed of the engine which is directly coupled through gears 23 and 26 to the clutch outer 15 is designed to overcome the bias force of the springs 29 such that the shoes 20 will move outwardly to engage the clutch drum of the starter clutch outer 19. The starter clutch outer 19 is also mounted about the driven shaft 14. The clutch outer 19 is mounted through bearings 30 in such a way that the clutch drum thereof extends over the shoes 20.

Located inwardly of the clutch inner 16 is a bearing 31. The bearing 31 is installed such that it can slide axially of the driven shaft 14. Centered within the bearing 31 is a clutch lifter 32 actuated by a clutch cam mechanism 33 for pressing the clutch lifter 32 to selectively move the bearing 31. The clutch cam mechanism is connected to the clutch lever 12 which is in turn connected to an actuating rod 34. Thus, a clutch actuator linkage is provided which, through rotation of the actuator rod 34, causes the clutch lifter 32 to be pressed toward the driven shaft 14. The coupling of the clutch actuator with the pressure shaft will be described below.

The cam mechanism 21 includes a loading plate 35 to actuate the pressure plate 18. A cam plate 36 is installed on the starter clutch outer 19 such that it must rotate therewith. A plurality of rolling elements or cam balls, there are three in this embodiment, are symmetrically placed between the two plates 35 and 36. A spacer 38 retains the cam balls in position. A clutch spring 39 is placed between the cam plate 36 and the starter clutch outer 19 to force the cam plates 35 and 36 together by specifically biasing the cam plate 36.

On the surface of the plate 35 opposed to the cam plate 36 an annular cam tract is arranged in the form of a peripheral groove 40. The groove is defined as having a set depth about its periphery. On the opposing surface of the cam plate 36 is another cam tract defined by a cam groove 41 which is of varying depth in the peripheral direction such that relative rotation between the cam plates 35 and 36 result in the cam balls 37 experiencing a deeper or shallower tract between the plates 35 and 36. Thus, relative rotation of the plates is translated into axial displacement of the plate 35 and in turn the pressure plate 18. As the pressure plate 18, which is constrained to rotate with the clutch inner 16, is pressed toward the clutch inner 16, it compresses the friction disc mechanism 17 for engaging the clutch inner 16 and the clutch outer 15.

A one-way clutch 42 is provided between the clutch outer 15 and the starter clutch outer 19 so as to couple the clutch outer 15 and the starter clutch outer 19 when the rotation of the clutch outer 15 is slower than the rotation of the starter clutch outer 19.

Between the clutch inner 16 and the pressure plate 18 there is a preset spring 43 which biases the two apart to uncouple the friction disc mechanism 17. Between the bearing 31 on which the clutch lifter 32 is installed and the pressure plate 18 there is a lift pin 44 slidably installed through the clutch inner 16. Thus, the operation of the clutch lifter 32 is directly transmitted to the pressure plate 18 by the actuator mechanism.

The operation of the embodiment of FIGS. 2, 3 and 4 may first be considered with the engine running at approximately an idle condition. The rotation of the engine is transmitted from the output shaft 25 through the drive gear 26 and the driven gear 23 to the clutch outer 15. With the engine running at a low speed, the resilient force of the springs 29 on the shoes of the centrigual clutch 11 is stronger than the centrifugal forces acting on the shoes rotating on the starter clutch inner associated with the clutch outer 15. With the starter clutch outer 15 at rest, there is no relative rotation between the cam plates 35 and 36 which would otherwise force the cam plate 35 axially toward the clutch inner 16. As a consequence, the friction disc mechanism is not engaged and the power transmission to the driven shaft 14 is cut off.

When the engine speed is increased beyond a preselected value, the centrifugal force acting on the clutch shoes 20 overcomes the springs 29 to allow the clutch shoes 20 to swing outwardly toward the clutch drum on the clutch outer 19. In this way, coupling between the clutch outer 15 and the starter clutch outer 19 occurs. With this engagement, relative rotation between the cam plates 35 and 36 occurs and the pressure plate 18 is thereby moved toward the clutch inner 16. By the movement of the pressure plate 18, the friction disc mechanism 17 engages the clutch outer 15 and the clutch inner 16 thereby transmitting power directly from the engine output shaft 25, through the clutch outer 15, through the clutch inner 16 and to the driven shaft 14.

In the process of such power transmission, the output of the engine may increase. The amount of relative turning between the cam plates 35 and 36 may occur as additional clamping force on the friction disc mechanism is required. Consequently, with increased engine power, the cam mechanism transfers more force to clamp the friction disc mechanism together.

When the engine is to be disconnected from the driven shaft 14, for purposes of shifting or the like, the actuating rod 34 may be turned. This results in the clutch lifter 32 and the bearing 31 moving to the left as can be seen in FIG. 2 to force the pin 44 to move the pressure plate 18 from the friction disc mechanism 17. This movement is against the resilient force of the clutch spring 39. In this way, power transmission through the clutch system is cut off. The actuation of the clutch lever 12 directly through to the pressure plate 18 provides a highly responsive low drag mechanism for good clutch disengagement.

The one-way clutch 42 provided between th clutch outer 15 and the starter clutch outer 19 is employed under conditions when the vehicle is decelerating with engine braking even if the rotational velocity of the engine is below the value to disengage the centrifugal clutch. Under such conditions, the rotation of the driven shaft 14 is transmitted to the cam plate 35 through the clutch inner 16 and the pressure plate 18. Relative rotation between the loading plate 35 and the cam plate 36 may then be experienced, particularly at lower speeds. Relative rotation generated between the plate 35 and the cam plate 36 is experienced with resulting relative rotation of the starter clutch outer 19. As the starter clutch outer 19 is made to rotate, relative rotation between the starter clutch outer and the manual clutch outer 15 is experienced. At this point, the one-way clutch 42 may be engaged and the compression braking action of the engine is transmitted to the driven shaft 14. Approaching idle, the engine loses its compression braking power and the one-way clutch is again released.

By placing the starter clutch 11 in the arrangement as described with the main clutch 13, advantageous compactness is realized. The present arrangement also is responsive, by means of the cam, to increased engine output by increasing the friction forces on the main clutch. In addition, in the arrangement employing the starter clutch 11 as one means for actuating the main clutch 13, the starter clutch 11 may be of lighter and smaller capacity sufficient to actuate the main clutch rather than act as an engagement means between the engine output shaft 25 and the driven shaft 14.

Figure 5:
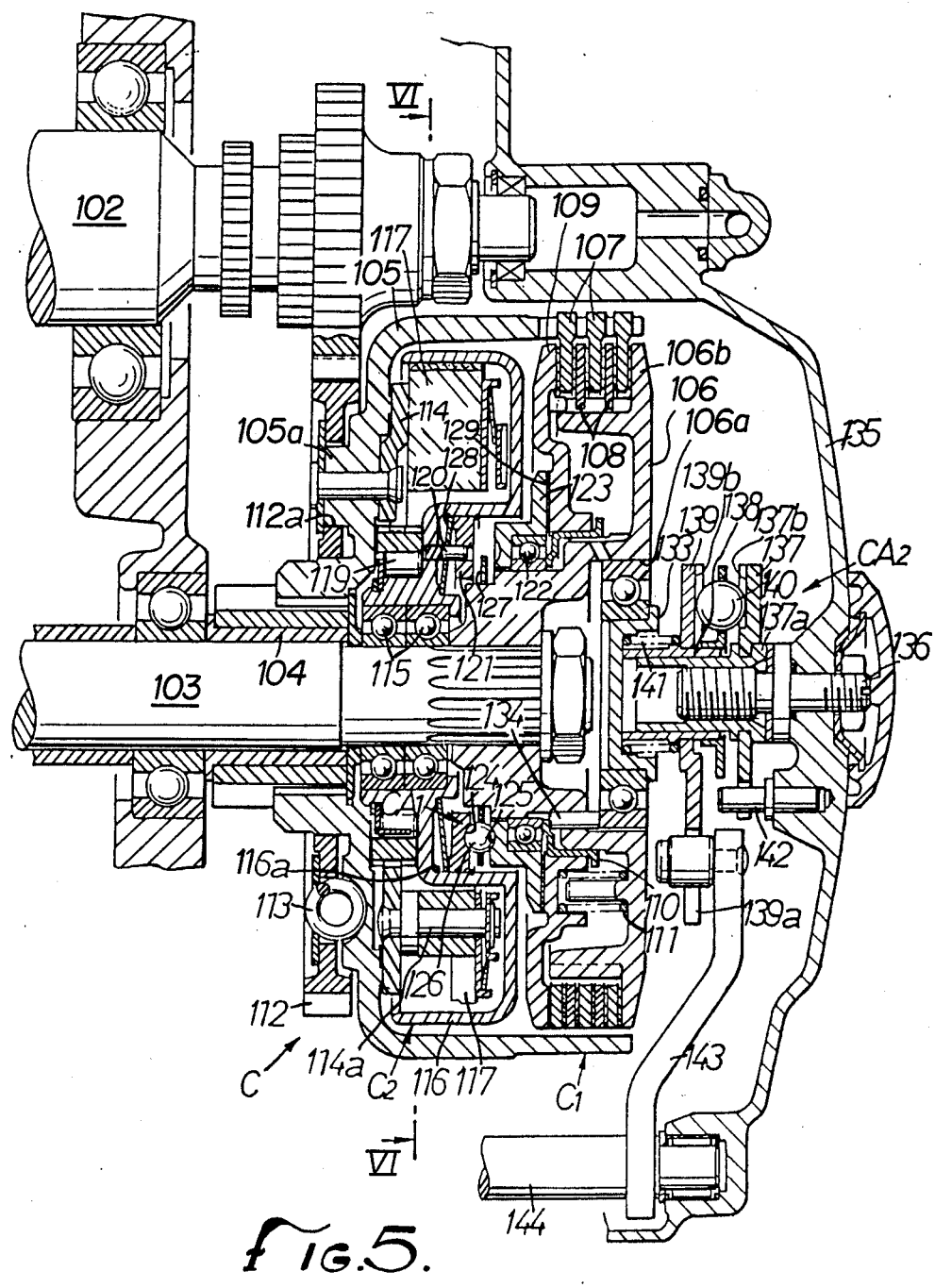
FIG. 5 is a cross-sectional view of a second embodiment of the present invention.
Figure 6:
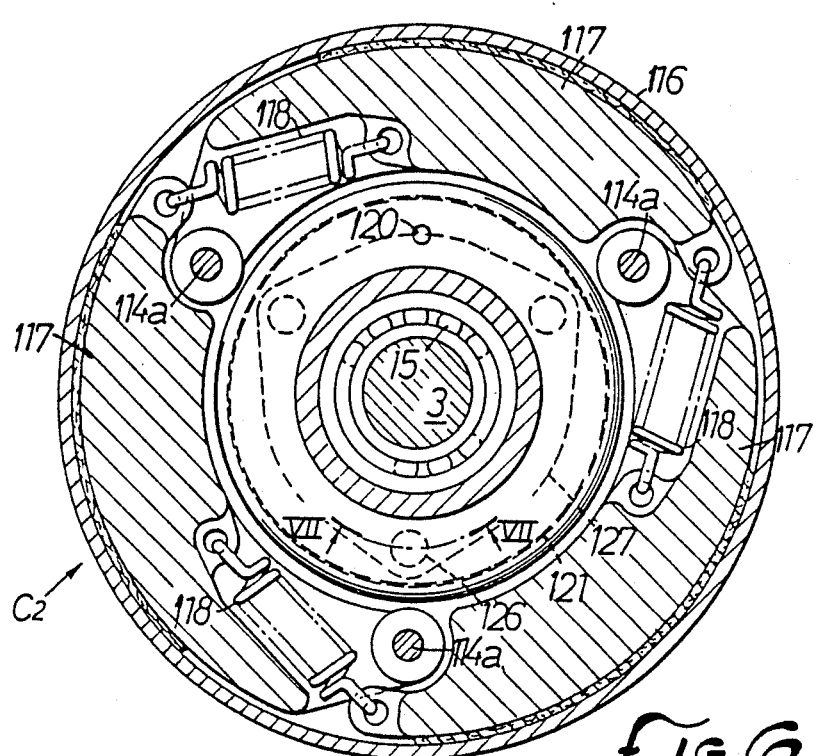
FIG. 6 is a cross-sectional end view taken along line VI—VI of FIG. 5.
Figure 7:
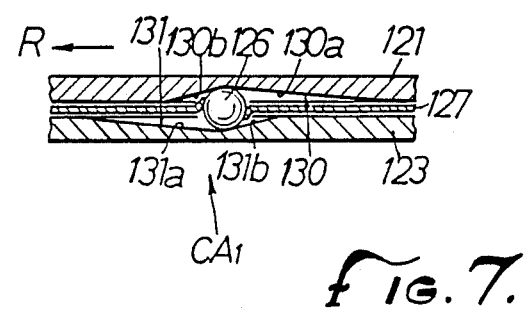
FIG. 7 is a cross-sectional view taken along line VII—VII of FIG. 6.

Looking to a second embodiment as set forth in FIGS. 5, 6 and 7, a similar layout is described. A crankshaft 102 and a driven shaft 103 are connected by means of a clutch system C. The clutch system C comprises a change clutch $C_1$ of the multiple disc type which couples and decouples by manual operation. A starter clutch $C_2$ of the centrifugal type is employed which couples and decouples automatically according to the speed of the crankshaft 102.

The change clutch $C_1$ is provided with a clutch outer 105 of a cylindrical shape having one end closed. The clutch outer 105 is supported through a bearing 104 on the driven shaft 103 at the closed end thereof. A clutch inner 106, surrounded by the clutch outer 105, is fixed to rotate with the rotating shaft 103. A plurality of driving friction discs 107 and driven friction discs 108 are slidably splined to the inner periphery of the clutch outer 105 and the outer periphery of the clutch inner 106, respectively. The discs 107 and 108 are alternately placed between a thrust plate 109 and a receiver plate 106b provided integrally on the outer periphery of the clutch inner 106. The thrust plate 109 is biased at all times in the direction away from the friction discs 107 and 108 by a return spring 111. The clutch outer 105 is coupled through a buffer spring 113 with a driven gear 112. The driven gear 112 is engaged with a gear on the crankshaft 102. Excessive deformation of the spring 113 is controlled by engagement of a slot 112a provided in the gear 112 and extending in the peripheral direction with an engaging projection 105a provided on the clutch outer 105. The projection 105a is inserted loosely into the slot 112a.

The starting clutch $C_2$ is provided with a driving plate 114 secured to the inner end of the clutch outer 105. A clutch drum 116 rotatably supported through bearings 115 by the driven shaft 103 is located between the driving plate 14 and the thrust plate 109. A plurality of clutch shoes 117 housed in the clutch drum 116 are swingably supported through branch shafts 114a by the driving plate 114. Return springs 118 are installed in tension between the adjacent shoes 117 as shown in FIG. 6. The shoes 117 are biased radially inwardly. A one-way clutch 119 for transmitting power from the clutch drum 116 to the clutch outer 105 under relative rotation in one direction is placed between the drum 116 and the clutch outer 105.

A cam mechanism $CA_1$ is provided between the clutch drum 116 and the thrust plate 109. The cam mechanism $CA_1$ has a first cam member 121 slidably supported in an annular cavity 116a on one side of the clutch drum 116. A turn stopper pin 120 is provided for checking rotation of the cam member 121 relative to the clutch drum 116. A second cam member 123 is rotatably supported through a bearing 122 by the clutch inner 106. A plurality of first and second cam grooves 124 and 125 are provided on opposite faces of the first and second cam members 121 and 123 at intervals in the peripheral direction. A cam bell 126 held between each pair of the first and second cam grooves 124 and 125 is arranged by a spacer 127 for maintaining a set peripheral distance between the balls 126. A clutch spring 128 is used for biasing the first cam member 121 toward the second cam member 123. The spring also forces the cam member 123 toward the thrust plate 109. A lining 129 for frictionally coupling the members 123 and 109 is located therebetween.

Each of the first cam grooves 124 extends in the peripheral direction of the first cam member 121. The bottom of each groove 124 defines a first cam face 130 formed into an approximate shallow V-shape in profile as seen in FIG. 7. A first gentle slope 130a descends toward the rotating direction R of the clutch outer 105. A steep slope 130b continues from the slope 130a and rises steeply toward the rotating direction R. Located in the bottom of the other cam groove 125 is a second cam face 131 also formed in a similar manner employing slopes 131a and 131b arranged oppositely to the surfaces of slope 103a and 130b.

A clutch lifter 133 is slidably and rotatably fitted through a bearing 132 in the annular cavity 106a outwardly of the clutch inner 106. The clutch lifter 133 is engaged with the thrust plate 109 through a sliding pin 134 installed through the clutch inner 106 and a cylindrical retainer 110. A cam mechanism $CA_2$ for pressing the clutch lifter 133 against the thrust plate 109 is provided on the outer side of the clutch lifter 133. The cam mechanism $CA_2$ comprises an adjustment bolt 136 screwed coaxially with the rotating shaft 133 into a side cover 135 attached to one side of the crankcase 101. A fixed cam plate 137 has a boss 137a screwed on the bolt 136. A movable cam plate 139 is slidably and rotatably supported by the outer periphery of the boss 137a through a collar 138. A cam ball 140 is placed between opposing cavities 137b and 139b of the two cam plates 137 and 139. A return spring 141 is employed for biasing the movable cam plate 139 toward the cam ball 140. The fixed cam plate 137 engages with a turn stopper pin 142 installed into the side cover 135 to be controlled for rotation. The movable cam plate 139 engages with the peripheral flange of the collar 138 so as to press the clutch lifter 133 against the thrust plate 109 through the collar 138. Furthermore, a notch 139a is provided on one side of the movable cam plate 139. This is engaged with the end of the clutch lever 143. The clutch lever 143 is operated by a pedal shaft 144 rotatably supported by the side cover 135.

In operation, the device is substantially similar to that of the first embodiment. Furthermore, during engine braking, the cam balls 126 descend each of the gentle slopes 130a and 131a to the bottoms of the first and second cam grooves 124 and 125 and then ascend each steep slope 130b and 131b. In this way, the main clutch $C_1$ is held in the engaged condition. However, the rate of conversion between the relative rotating torque between the first and second cam members 121 and 123 of the cam mechanism $CA_1$ into axial thrust decreases as the cam faces become steeper. In this way, even with the same relative torque during engine braking as otherwise applied during powered operation, the thrust is smaller on the clutch. This allows the possibility for clutch slippage to avoid excessive loading to the transmission.

Accordingly, two improved clutch mechanisms have been disclosed employing automatic starting clutch capability as well as manual capability. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A clutch system for a vehicle having a variable speed engine output shaft and a driven shaft, comprising:
   a first clutch including a clutch input member rotatably mounted about the driven shaft and coupled to the engine output shaft, a clutch output member mounted on and coupled with the driven shaft, a friction disc mechanism between said clutch input member and said clutch output member and a pressure plate for controlling said friction disc mechanism to engage said clutch input member and said clutch output member;
   a starter clutch having a starter clutch input member rotatable about the driven shaft with said first clutch input member, a starter clutch output member rotatably mounted about the driven shaft and centrifugal engaging means for engaging said starter clutch input member and said starter clutch output member;
   a cam mechanism between said starter clutch output member and said pressure plate constructed and arranged to translate relative rotatational motion between said starter clutch output member and said pressure plate into axial motion of said pressure plate for controlling said friction disc mechanism; and
   a clutch actuator including linkage means operatively connected to said pressure plate for selectively moving said pressure plate axially away from said friction disc mechanism.

2. The clutch system of claim 1 wherein said first clutch input member is a clutch outer and said first clutch output member is a clutch inner.

3. The clutch system of claim 1 wherein said friction disc mechanism is a plurality of adjacent discs with alternating said discs being fixed to said first clutch input member and said first clutch output member.

4. The clutch system of claim 1 wherein said starter clutch input member is a clutch inner, said starter clutch output member is a clutch outer having a clutch drum, and said centrifugal engaging means includes shoes pivotally mounted to said starter clutch input member to engage said clutch drum at a preselected rotational speed.

5. The clutch system of claim 1 wherein said cam mechanism includes a first annular cam surface and a second annular cam surface, both said cam surfaces being mutually facing and position about the driven shaft, said first annular cam surface being engaged with said pressure plate and said second annular cam surface being engaged with said starter clutch output member.

6. The clutch system of claim 5 wherein said cam mechanism further includes rolling elements between said first annular cam surface and said second annular cam surface.

7. The clutch system of claim 6 wherein said cam mechanism further includes a spring biasing one of said annular cam surfaces toward the other of said annular cam surfaces.

8. The clutch system of claim 1 further comprising spring means for biasing said pressure plate away from said friction disc mechanism.

9. The clutch system of claim 1 wherein said cam mechanism has camming surfaces of varying slope to vary the ratio of relative rotational motion to relative axial motion between said starter clutch output member and said pressure plate under different load conditions on the shafts.

10. The clutch system of claim 1 further comprising a one-way clutch positioned between said first clutch input member and said starter clutch output member.

11. A clutch system for a vehicle having a variable speed engine output shaft and a driven shaft comprising:
    a first clutch including a clutch input member rotatably mounted about the driven shaft and coupled to the engine output shaft, a clutch output member mounted on and coupled with the driven shaft, a friction disc mechanism between said clutch input member and said clutch output member and a pressure plate for controlling said friction disc mechanism to engage said clutch input member and said clutch output member;
    a starter clutch having a starter clutch input member rotatable about the driven shaft with said first clutch input member, a starter clutch output member rotatably mounted about the driven shaft and centrifugal engaging means for engaging said starter clutch input member and said starter clutch output member;
    a cam mechanism between said starter clutch output member and said pressure plate constructed and arranged to translate relative rotational motion between said starter clutch output member and said pressure plate into axial motion of said pressure plate for controlling said friction disc mechanism, said cam mechanism including a first annular cam surface and a second annular cam surface, both said cam surfaces being mutually facing and positioned about the driven shaft, said first annular cam surface being engaged with said pressure plate and said second annular cam surface being engaged with said starter clutch output member, said cam mechanism further including a spring biasing one of said annular cam surfaces toward the other of said annular cam surfaces;
    spring means for biasing said pressure plate away from said friction disc mechanism; and a clutch actuator including linkage means extending to said pressure plate to selectively move said pressure plate axially away from said friction disc mechanism.

12. The clutch system of claim 11 wherein said cam mechanism further includes roller elements between said first annular cam surface and said second annular cam surface.

13. The clutch system of claim 12 wherein said starter clutch input member is a clutch inner, said starter clutch output member is a clutch outer having a clutch drum, and said centrifugal engaging means includes shoes pivotally mounted to said first clutch input member to engage said clutch drum at a preselected rotatational speed.

14. A clutch system for a vehicle having a variable speed engine output shaft and a driven shaft, comprising:
a first clutch including a clutch input member rotatably mounted about the driven shaft and coupled to the engine output shaft and defining a cylindrical cavity substantially closed at one end, a clutch output member mounted on and coupled with the driven shaft and being positioned within said cylindrical cavity, a friction disc mechanism between said clutch input member and said clutch output member and positioned within said cylindrical cavity and a pressure plate for controlling said friction disc mechanism to engage said clutch input member and said clutch output member, said pressure plate being between said closed end of said cylindrical cavity and said clutch output member;
a starter clutch having a starter clutch input member rotatably mounted about the driven shaft with said clutch input member, a starter clutch output member rotatably mounted about the driven shaft and a centrifugal engaging means for engaging said starter clutch input member and said starter clutch output member, said starter clutch being positioned between said closed end of said cylindrical cavity and said pressure plate;
a cam mechanism between said starter clutch output member and said pressure plate constructed and arranged to translate relative rotational motion between said starter clutch output member and said pressure plate into axial motion of said pressure plate for controlling said friction disc mechanism; and
an actuator linkage for forcing said pressure plate away from said discs, said actuator linkage extending through a plate of said first clutch output member to engage said pressure plate.

15. The clutch system of claim 15 further comprising a one-way clutch positioned between said first clutch input member and said starter clutch output member.

16. The clutch system of claim 15 wherein said cam mechanism has camming surfaces of varying slope to vary the ratio of relative rotational motion to relative axial motion between said starter clutch output member and said pressure plate under different load conditions of the shafts.

17. A clutch system for a vehicle having a variable speed engine output shaft and driven shaft, comprising:
a first clutch including a clutch outer defining a cylindrical cavity substantially closed at one end and being rotatably mounted about the driven shaft and coupled to the engine output shaft, a clutch inner positioned within said cylindrical cavity and being mounted on and coupled with the driven shaft, a plurality of friction discs between said clutch inner and said clutch outer, alternate said discs being fixed to said clutch outer and the other of said discs being fixed to said clutch inner, a pressure plate extending on one side of said friction discs, and said clutch inner extending to the other side thereof, said pressure plate being axially movable and fixed to rotate with said clutch inner;
a starter clutch having a starter clutch inner rotatable about the driven shaft with said first clutch outer, a starter clutch outer rotatably mounted about the driven shaft, said starter clutch inner and said starter clutch outer being located within said cavity between said first clutch inner and the closed end of said first clutch outer, and shoes pivotally mounted to said starter clutch inner, said starter clutch outer having a clutch drum to receive said shoes;
a one-way clutch positioned between said first clutch outer and said starter clutch outer; and
a cam mechanism between said starter clutch outer and said pressure plate and constructed and arranged to translate relative rotational motion between said starter clutch outer and said pressure plate into axial motion of said pressure plate toward said friction discs for controlling engagement between said clutch inner and said clutch outer.

18. The clutch system of claim 18 comprising an actuator linkage for forcing said pressure plate away from said discs, said actuator linkage extending through a plane defined by said first clutch inner to engage said pressure plate.

19. The clutch system of claim 18 wherein said cam mechanism includes a first annular cam track about said driven shaft axially abutting said pressure plate, a second annular cam track facing said first cam track and being positioned about the driven shaft, said starter clutch outer being adjacent said second annular cam track and fixed to rotate therewith, a spring between said second cam track and said starter clutch outer to bias said second cam track toward said first cam track, and roller elements between said cam tracks, at least one of said cam tracks having a surface thereon inclined in the axial direction of the driven shaft.

20. The clutch system of claim 18 wherein said cam mechanism has camming surfaces of varying slope to vary the ratio of relative rotational motion to relative axial motion between said starter clutch outer and said pressure plate under different load conditions on the shafts.

* * * * *

UNITED STATES PATENT AND TRADEMARK OFFICE
CERTIFICATE OF CORRECTION

PATENT NO. : 4,753,330
DATED : June 28, 1988
INVENTOR(S) : KOUHEI OHZONO, et al.

It is certified that error appears in the above-identified patent and that said Letters Patent are hereby corrected as shown below:

On line 8, column 8, replace "position" with -- positioned --.

On line 9, column 9, replace "12" with -- 11 --.

On line 56, column 9, replace "15" with -- 14 --.

On line 59, column 9, replace "15" with -- 14 --.

On line 39, column 10, replace "18" with -- 17 --.

On line 44, column 10, replace "18" with -- 17 --.

On line 56, column 10, replace "18" with -- 17 --.

Signed and Sealed this

Seventh Day of March, 1989

Attest:

DONALD J. QUIGG

*Attesting Officer*  *Commissioner of Patents and Trademarks*